(12) United States Patent
Takayama et al.

(10) Patent No.: US 9,030,574 B2
(45) Date of Patent: May 12, 2015

(54) IMAGING APPARATUS CAPABLE OF CORRECTING WHITE BALANCE BASED ON AN OUTPUT SIGNAL AMPLIFICATION GAIN AND WHITE BALANCE GAIN

(75) Inventors: Koji Takayama, Osaka (JP); Mariko Yamazaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 549 days.

(21) Appl. No.: 13/280,393

(22) Filed: Oct. 25, 2011

(65) Prior Publication Data

US 2012/0105669 A1 May 3, 2012

(30) Foreign Application Priority Data

Oct. 27, 2010 (JP) ................................. 2010-240470

(51) Int. Cl.
*H04N 9/73* (2006.01)

(52) U.S. Cl.
CPC ..................................... *H04N 9/735* (2013.01)

(58) Field of Classification Search
CPC ... H04N 5/2252; H04N 5/225; H04N 5/2352; H04N 5/235; H04N 5/243; H04N 9/735; H04N 9/045; H04N 1/6086
See application file for complete search history.

(56) References Cited

U.S. PATENT DOCUMENTS

| | | | | |
|---|---|---|---|---|
| 7,432,962 B2 * | 10/2008 | Oda et al. | ................... | 348/229.1 |
| 7,692,699 B2 * | 4/2010 | Kobayashi | ................... | 348/244 |
| 8,009,201 B2 * | 8/2011 | Takayama | ................... | 348/222.1 |
| 8,416,316 B2 * | 4/2013 | Park et al. | ................... | 348/223.1 |
| 2004/0239774 A1 * | 12/2004 | Takeshita | ................... | 348/223.1 |
| 2008/0143845 A1 * | 6/2008 | Miki et al. | ................... | 348/223.1 |
| 2011/0058063 A1 * | 3/2011 | Lee | ................... | 348/223.1 |

FOREIGN PATENT DOCUMENTS

| | | |
|---|---|---|
| JP | 7-23400 | 1/1995 |
| JP | 2001-204042 | 7/2001 |
| JP | 2002-281512 | 9/2002 |

* cited by examiner

*Primary Examiner* — Luong T Nguyen
(74) *Attorney, Agent, or Firm* — Panasonic Patent Center

(57) ABSTRACT

An imaging apparatus includes an imaging sensor operable to capture a subject image and output image information, a gain setting unit operable to set a value of an output signal amplification gain according to a value of ISO sensitivity for amplifying the image information output from the imaging sensor, a determination unit operable to determine a value of white balance gain to be used for white balance correction according to the value of the output signal amplification gain set by the gain setting unit, and a white balance correcting unit operable to perform white balance correction on the image information output from the imaging sensor based on the value of the output signal amplification gain set by the setting unit and the value of the white balance gain determined by the determination unit.

10 Claims, 9 Drawing Sheets

IMAGING APPARATUS CAPABLE OF CORRECTING WHITE BALANCE BASED ON AN OUTPUT SIGNAL AMPLIFICATION GAIN AND WHITE BALANCE GAIN

BACKGROUND

1. Technical Field

The present invention relates to imaging apparatuses and, more specifically, to an imaging apparatus capable of correcting white balance.

2. Related Art

A digital camera described in, for example, JP-A-7-023400 calculates a white balance gain based on image information output from an imaging sensor and corrects white balance to the image information.

An image signal output from an imaging sensor contains a noise component. Since the higher an ISO sensitivity becomes, the higher an output signal amplification gain becomes, and an influence of the noise component in the image signal becomes strong. For this reason, conventionally high-sensitivity ISO such as ISO6400 or ISO12800 has not been used. However, a noise problem in high sensitivity ISO is being solved due to recent improvement in techniques, and the use of high sensitivity ISO is demanded.

In the conventional white balance correction, a white balance gain is calculated based not on ISO sensitivity which is set but predetermined ISO sensitivity (for example, 100), and white balance is corrected based on the calculated white balance gain.

However, in a case where shooting of an image is carried out with high sensitivity ISO such as ISO6400 or ISO12800, when the white balance gain is calculated based on the predetermined ISO sensitivity (for example, 100), colors are not suitably reproduced in an image after the white balance correction.

Embodiments of the present invention were devised in view of the above problem, and an object thereof is to provide an imaging apparatus capable of performing white balance correction which enables reproduction of suitable colors even when high sensitivity ISO is used.

SUMMARY

To address the foregoing problem, an imaging apparatus according to embodiments of the present invention includes an imaging sensor operable to capture a subject image and output image information, a gain setting unit operable to set a value of an output signal amplification gain according to a value of ISO sensitivity for amplifying the image information output from the imaging sensor, a determination unit operable to determine a value of white balance gain to be used for white balance correction according to the value of the output signal amplification gain set by the gain setting unit, and, a white balance correcting unit operable to perform white balance correction on the image information output from the imaging sensor based on the value of the output signal amplification gain set by the setting unit and the value of the white balance gain determined by the determination unit.

According to the embodiments of the present invention, the value of the white balance gain to be used for the white balance correction is determined based on the value of the output signal amplification gain according to ISO sensitivity, and white balance is corrected based on the determined value of the white balance gain. Therefore, the white balance correction can be performed based on the value of the ISO sensitivity. As a result, the white balance can be adjusted so that suitable colors can be reproduced regardless of a value of ISO sensitivity. For example, even at the time of high sensitivity in which the value of the ISO sensitivity is large, white balance can be adjusted so that suitable colors can be reproduced.

DETAILED DESCRIPTION OF PREFERRED EMBODIMENTS

First Embodiment

A digital camera according to an embodiment will be described below with reference to the drawings.

1. Configuration

First, a configuration of a digital camera 100 according to a first embodiment will be described.

1-1. Configuration of the Digital Camera 100

Figure 1:
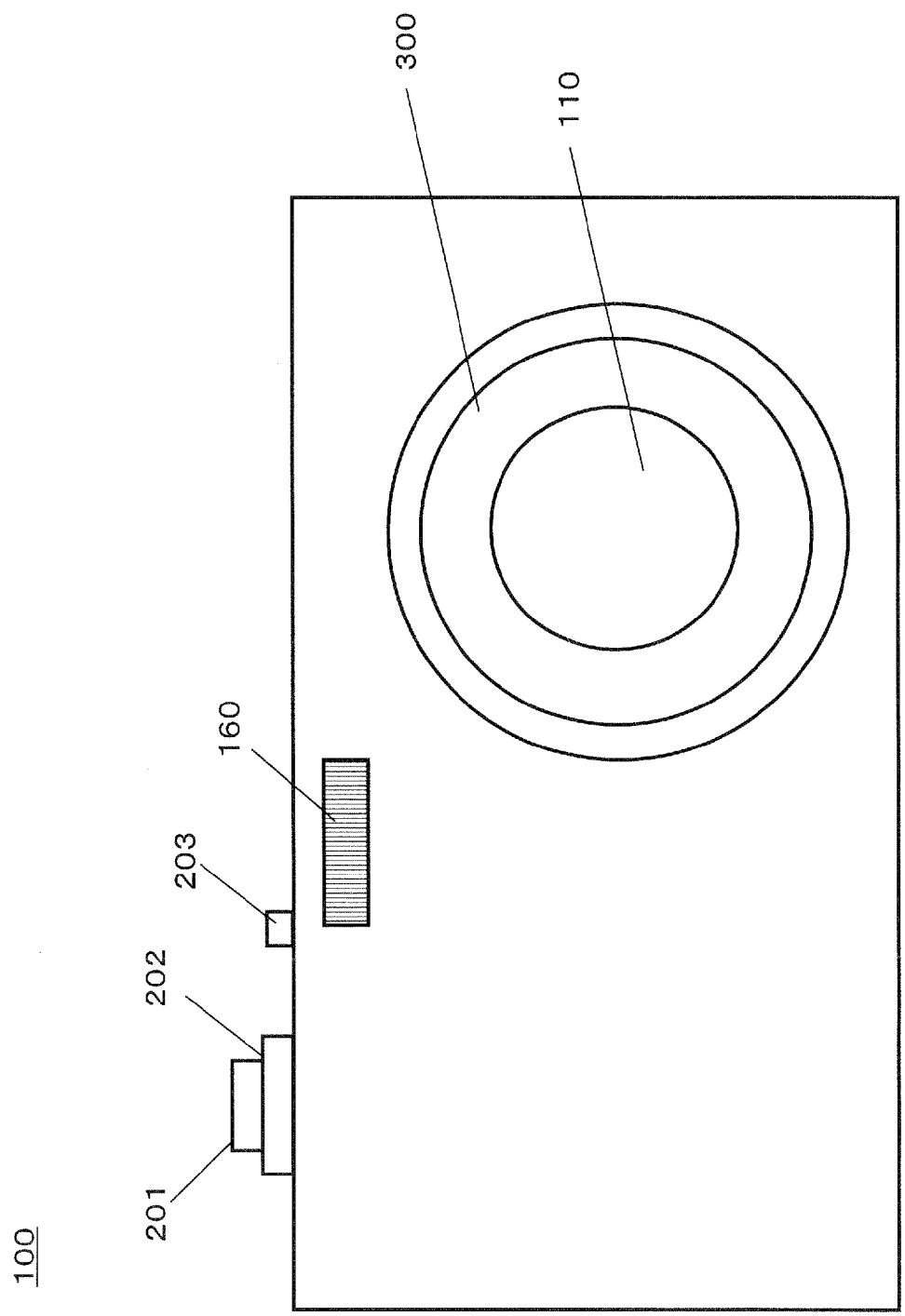
FIG. 1 is a front view illustrating a digital camera according to an embodiment.

FIG. 1 is a front view of the digital camera 100. The digital camera 100 is provided with a lens barrel 300 that accommodates an optical system 110, and a flashbulb 160 on its front surface. The digital camera 100 is provided with operation members such as a release button 201, a zoom lever 202, and a power button 203 on its upper surface.

Figure 2:
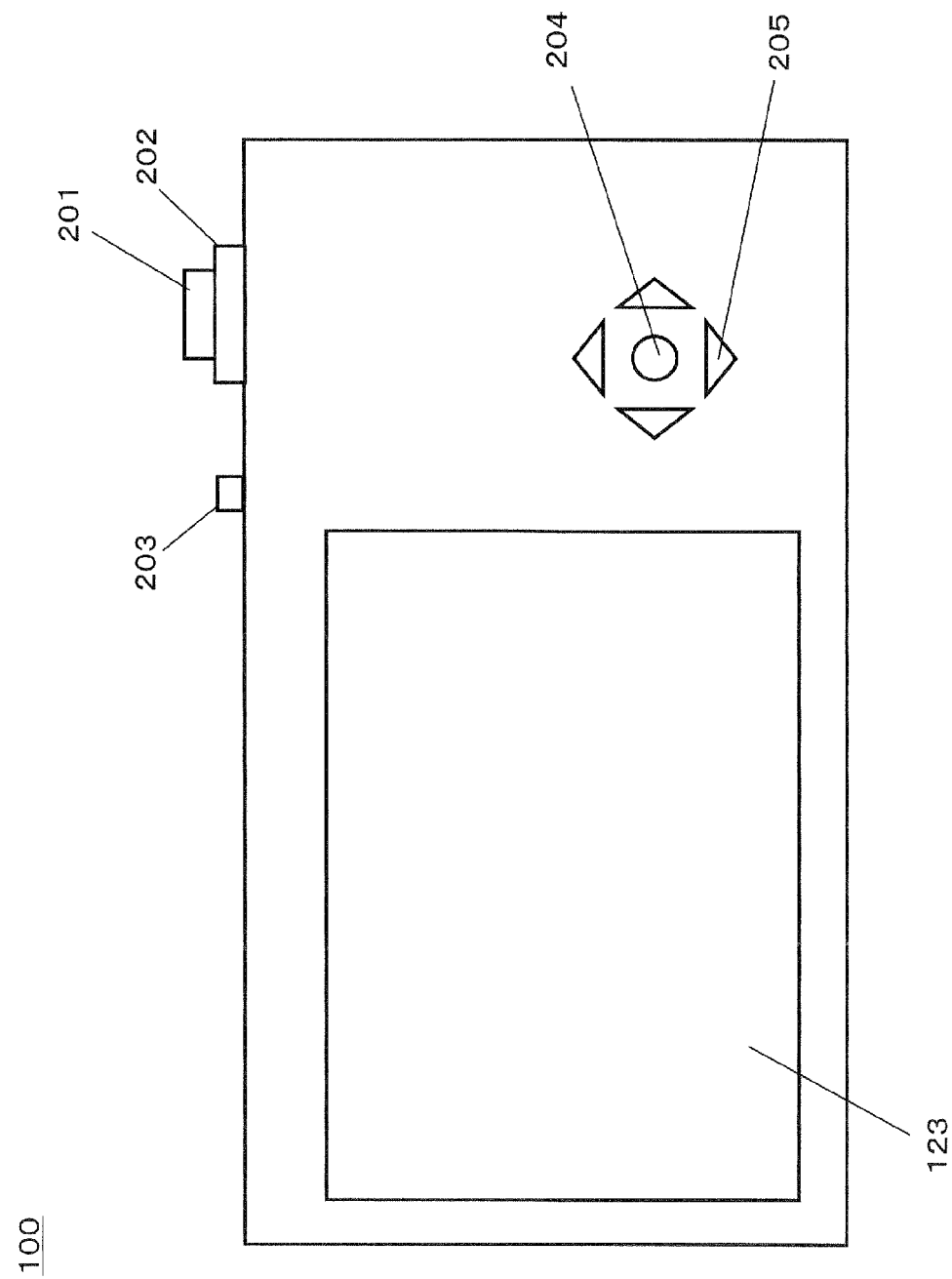
FIG. 2 is a rear view illustrating the digital camera according to the embodiment.

FIG. 2 is a rear view of the digital camera 100. The digital camera 100 is provided with a liquid crystal monitor 123 on its rear surface. The digital camera 100 is provided with operation members such as a center button 204 and a cross button 205 on its rear surface.

Figure 3:
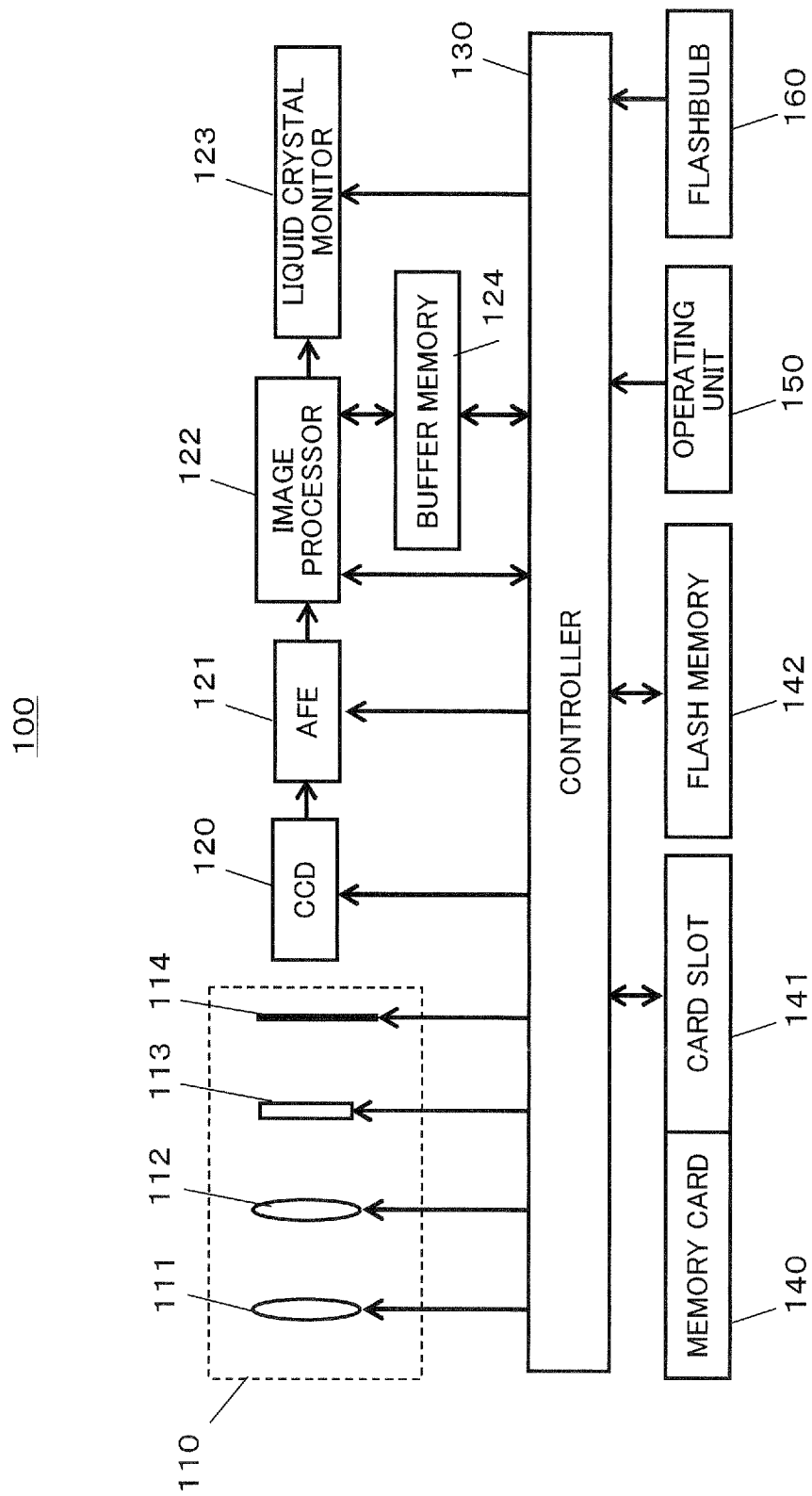
FIG. 3 is an electric configuration diagram illustrating the digital camera according to the embodiment.

FIG. 3 is a diagram illustrating an electric configuration of the digital camera 100. The digital camera 100 has the optical system 110, a CCD image sensor 120, AFE (analog front end) 121, an image processor 122, the liquid crystal monitor 123, a buffer memory 124, a controller 130, a card slot 141, a flash memory 142, an operating unit 150, and the flashbulb 160. The digital camera 100 images a subject image on a light receiving surface of the CCD image sensor 120 via the optical system 110, and the CCD image sensor 120 captures the imaged subject image. The CCD image sensor 120 generates image information about the captured subject image. The generated image information is subject to various processes in the AFE 121 and the image processor 122. The image information that was subject to the various processes is recorded in the flash memory 142 or a memory card 140. The image information recorded in the flash memory 142 and/or the memory card 140 can be displayed on the liquid crystal monitor 123 according to an operation to the operating unit 150 by a user. Details of the respective configurations shown in FIGS. 1 to 3 will be described below.

The optical system 110 includes a focus lens 111, a zoom lens 112, a diaphragm 113, and a shutter 114 and the like. The optical system 110 may include an optical image stabilizer (OIS). Respective lenses such as the focus lens 111 and the zoom lens 112 composing the optical system 110 can be composed of one or a plurality of lenses. Furthermore, the respective lenses can be composed of one group or a plurality of groups of lenses.

The focus lens 111 is used for adjusting a focus state to a subject. The zoom lens 112 is used for adjusting an angle of view to a subject. The diaphragm 113 is used for adjusting a quantity of light incident on the CCD image sensor 120. The shutter 114 adjusts the quantity of light incident on the CCD image sensor 120 (exposure time). The focus lens 111, the zoom lens 112, the diaphragm 113, and the shutter 114 are driven by corresponding driving units such as a DC motor and a stepping motor according to a control signal output from the controller 130.

A number of photodiodes are arranged in a two-dimensional manner on the light receiving surface of the CCD image sensor 120. Primary-color (R, G, and B) filters are arranged for the respective photodiodes in a predetermined array structure. Light from a subject to be captured passes through the optical system 110, and is imaged on the light receiving surface of the CCD image sensor 120. The imaged subject image is converted into color information of R, G, and B according to the quantity of light incident on the photodiodes. That is, the image information representing the subject image is generated. The respective photodiodes correspond to pixels of the CCD image sensor 120. The color information output from the respective photodiodes is any one of primary-color information about R, G, and B. The information about colors to appear on the respective pixels (image information) is generated in the image processor 122 based on color information (information about color, the quantity of light, and the like) output from the photodiodes corresponding to the pixels and from photodiodes which are disposed around the photodiodes corresponding to the pixels. In the following description, the image information is suitably described as (R1, G1, and B1) obtained by combining values of R, G, and B on the pixels. At this time, the values of R, G, and B in respective components (R, G, and B) represent a combination degree of the respective primary colors.

The CCD image sensor 120 operates based on several driving modes corresponding to operating modes of the digital camera 100. The operating modes of the digital camera 100 include a still image recording mode, a moving image recording mode, and a through image recording mode. The still image recording mode is an operating mode at the time when the CCD image sensor 120 captures a still image. In the still image recording mode, the controller 130 performs an operation for reading accumulated charges of the CCD image sensor 120, giving preference to image quality over the other parameters, so that the image quality of a still image to be captured is satisfactory. The moving image recording mode is an operating mode at the time when the CCD image sensor 120 captures a moving image. In the moving image recording mode, the controller 130, when recording the moving image to the memory card 140, performs the operation for reading accumulated charges of the CCD image sensor 120 to secure image quality required by a moving image to be captured, and to obtain a sufficient recording speed. The through image recording mode is an operating mode at the time when the CCD image sensor 120 captures a through image. A through image is for continuously displaying images generated by the CCD image sensor 120 at every predetermined/constant time. In the through image recording mode, the controller 130 performs the operation for reading accumulated charges of the CCD image sensor 120, to secure image quality required by the through image to be captured, and to obtain a sufficient display speed when displaying the through image on the liquid crystal monitor 123.

The AFE 121 suppresses noises caused by correlated double sampling in the image information read from the CCD image sensor 120. The AFE 121 allows an analog gain controller to multiply the image information by a gain (output signal amplification gain) based on a value of ISO sensitivity. The AFE 121 allows an AD converter to carry out AD conversion of the image information. Thereafter, the AFE 121 outputs the image information to the image processor 122.

The image processor 122 executes various processes on the image information output from the AFE 121. The various processes include, for example, BM (block memory) integration, smear correction, white balance correction, gamma correction, a YC converting process, an electronic zoom process, a compressing process, and an expanding process, but the processes are not limited to them. The image processor 122 may be constituted by a hard-wired electronic circuit or by a microcomputer or the like using a program. Further, the image processor 122 as well as the controller 130 may be constituted by one semiconductor chip.

Figure 4:
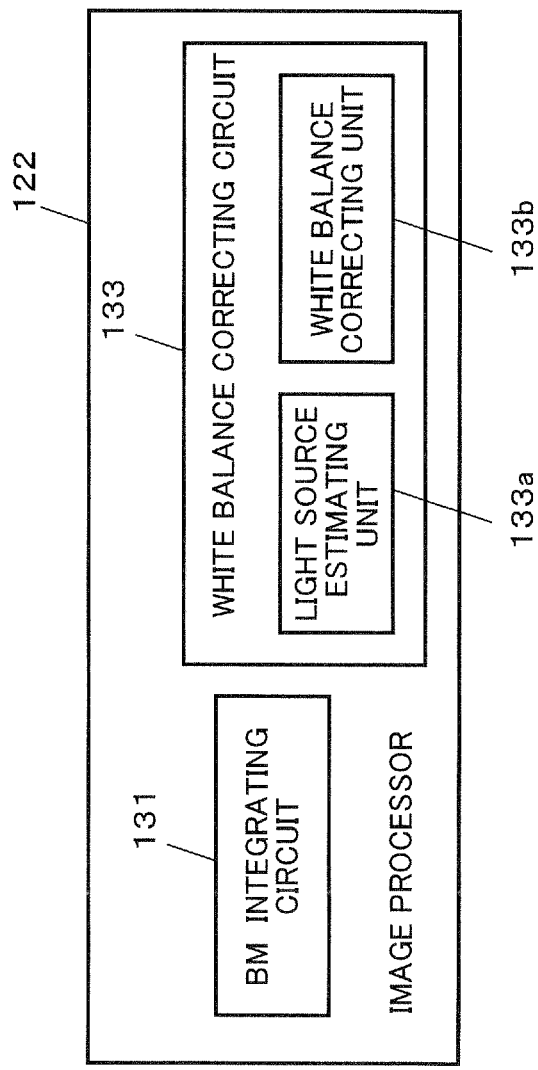
FIG. 4 is an electric configuration diagram illustrating an image processor according to the embodiment.
Figure 5:
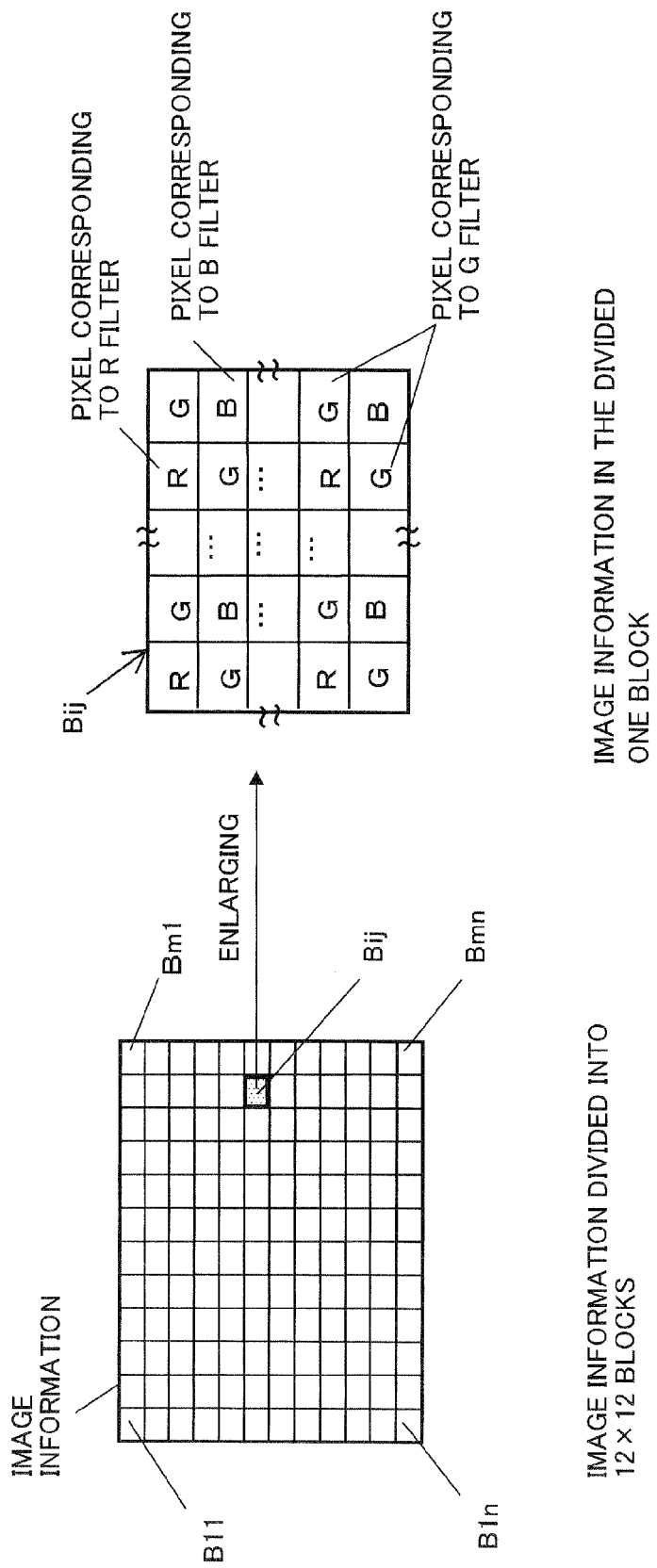
FIGS. 5A and 5B are diagrams for describing a block memory according to the embodiment.

The image processor 122, as shown in FIG. 4, has a BM integrating circuit 131 which generates BM data for the input image information. FIGS. 5A and 5B are diagrams describing an outline of a function of the BM integrating circuit 131. The BM integrating circuit 131 divides the image information of an input frame into n×m blocks Bij as shown in FIG. 5A. FIG. 5A illustrates a case where n=12 and m=12, namely, the image information is divided into 144 blocks composed of 12×12 Bij (i=1 to 12, j=1 to 12). As shown in FIG. 5B, the divided blocks Bij have primary-color information about R, G, and B of which number is the same as the number of pixels included in the blocks. Thereafter, the BM integrating circuit 131 integrates the quantity of light in the pixels included in each block (for example, brightness value) for R pixels, G pixels, and B pixels. The BM integrating circuit 131 then calculates each average value of R pixels, G pixels, and B pixels. The calculated average value of intensity of R, G, and B pixels in each block is called BM data. The calculated BM data for the respective blocks are stored in a memory (not shown) and are taken out as the need arises. The BM integrating circuit 131 generates the BM data in the above method in the respective divided 144 blocks.

The image processor 122 further has a white balance correcting circuit 133 for adjusting white balance to the input image information. The white balance correcting circuit 133 has a light source estimating unit 133a, a white balance correcting unit 133b, and the like. The white balance correction includes correction using an auto-white balance function and correction using a manual white balance function.

In the correction using the auto-white balance function, the white balance correcting circuit 133 automatically estimates color temperature of a light source. The automatic estimation of color temperature of the light source is performed by the light source estimating unit 133a. The light source estimating unit 133a inputs the BM data, and estimates a light source color to be applied to the white balance correction based on the input BM data. The light source estimating unit 133a notifies the controller 130 of the estimated light source color. The controller 130 determines a white balance gain to be applied based on the notified light source color, and notifies the white balance correcting unit 133b in the white balance correcting circuit 133 of the determined result. The white balance correcting unit 133b multiplies the image information by the determined white balance gain, and outputs the image information to another processor in the image processor 122. This other processor outputs the data that is processed by the process of the white balance correcting circuit 133 and a process described later, to the liquid crystal monitor 123 and to the buffer memory 124.

On the other hand, in the adjustment using the manual white balance function, a user can arbitrarily set the color temperature of the light source. As a method for arbitrarily setting the color temperature of the light source by the user, for example, a method for selecting a typical light source such as a light bulb (3200 K), a fluorescent tube (4500 K), solar light (5500 K) or cloudy sky (6500 K), or a method for specifying the color temperature based on a numerical value K (kelvin). The controller 130 determines a white balance gain to be applied based on the light source color set by the user, and notifies the white balance correcting circuit 133 of the determined result. The white balance correcting circuit 133 multiplies image information by the determined white balance gain, and outputs the image information to the processor in the image processor 122.

The liquid crystal monitor 123 displays an image based on the image information processed by the image processor 122. The image to be displayed on the liquid crystal monitor 123 includes a through image and a reduction-recorded image. The through image is an image for continuously displaying images generated by the CCD image sensor 120 at every predetermined/constant time on the liquid crystal monitor 123 during the imaging. Normally, the through image is generated by the image processor 122 based on image information generated by the CCD image sensor 120, when the digital camera 100 is in the recording mode. When the through image is displayed on the liquid crystal monitor 123, the user can carry out photographing while checking a composition of a subject by referring to the through image displayed on the liquid crystal monitor 123. The reduction-recorded image is an image for displaying an image recorded in the memory card 140 and the like on the liquid crystal monitor 123 when the digital camera 100 is in the reproducing mode, and an image that is reduced by reducing high pixels of an image recorded in the memory card 140 and the like, to low pixels. After the user s operation of the release button 201 is accepted, the high-pixel image information recorded in the memory card 140 is generated by the image processor 122 based on the image information generated by the CCD image sensor 120.

The controller 130 controls an operation of the entire digital camera 100 in an integrated manner. The controller 130 may be composed of a hard-wired electronic circuit or a microcomputer. Further, the controller 130 as well as the image processor 122 may be composed of one semiconductor chip.

The flash memory 142 functions as an internal memory for recording image information and the like. The flash memory 142 stores programs relating to autofocus control (AF control), auto exposure control (AE control), and light emission control of the flashbulb 160, and a program for controlling the operation of the entire digital camera 100 in the integrated manner.

Figure 6:
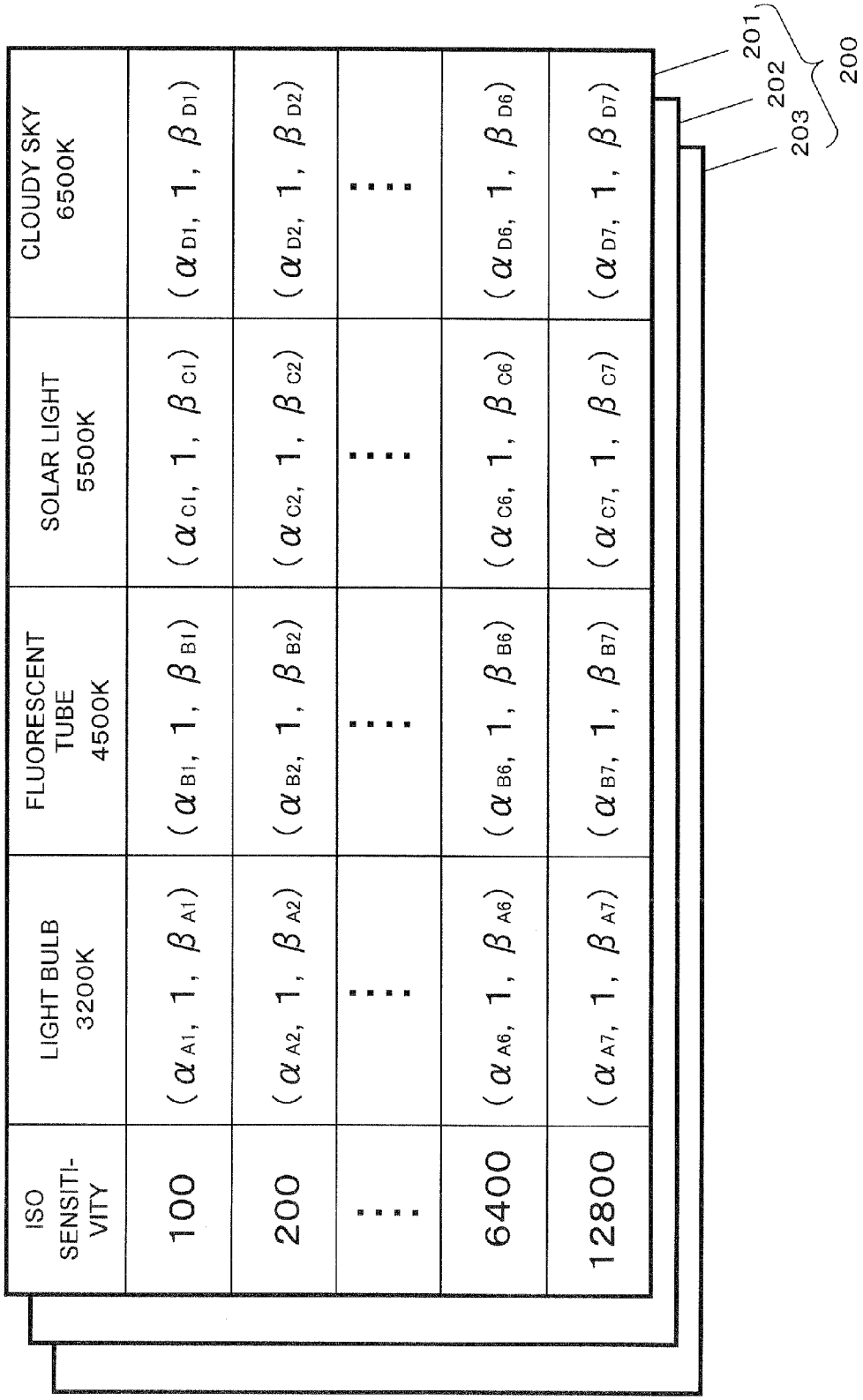
FIG. 6 is a white balance gain setting table according to the embodiment.

Further, the flash memory 142 stores a white balance gain setting table 200. FIG. 6 illustrates the white balance gain setting table. As shown in FIG. 6, in the white balance gain setting table 200, the white balance gains corresponding to the values of the ISO sensitivity settable in the digital camera 100 are defined for a certain light source (color temperature). For example, the white balance gains at the time when the ISO sensitivity regarding a light bulb (3200 K) is ISO100, ISO200, ISO6400, and ISO12800 are defined. Similarly, the white balance gains at the time when the ISO sensitivities regarding a fluorescent tube (4500 K), solar light (5500 K), and cloudy sky (6500 K) as another light sources are ISO100, ISO200, ISO6400, and ISO12800 are defined. These white balance gains are multiplied by results which are obtained by multiplying image information containing an image signal component and a noise component output from the CCD image sensor 120 by gains according to the respective values of ISO sensitivity by the white balance correcting circuit 133. For example, the white balance gain at the time of ISO100 is multiplied by a result which is obtained by multiplying image information containing an image signal component and a noise component output from the CCD image sensor 120 by a gain according to ISO100, by the white balance correcting circuit 133. Similarly, the white balance gain at the time of ISO6400 is multipled by a result which is obtained by multiplying image information output from the CCD image sensor 120 by a gain according to ISO6400, by the white balance correcting circuit 133. As described above, the white balance correcting circuit 133 multiplies the image information output from the CCD image sensor 120 by the white balance gains according to the ISO sensitivity. Thus, an image of which color reproducibility is improved can be obtained regardless of ISO sensitivity. In particular, at the time of high ISO sensitivity, since linearity of an image signal component output from the CCD image sensor 120 shifts in each color component more greatly at high ISO sensitivity than that at the time of standard ISO sensitivity, the color reproducibility is easily deteriorated. In this embodiment, however, such a problem is reduced.

The white balance gain setting table 200 is provided for each driving mode of the CCD image sensor 120. That is, the flash memory 142 stores a white balance gain setting table 201 corresponding to the still image recording mode, a white balance gain setting table 202 corresponding to the moving image recording mode, and a white balance gain setting table 203 corresponding to the through image recording mode. As a result, the controller 130 can read necessary information from the white balance gain setting tables corresponding to the driving modes of the CCD image sensor 120.

The buffer memory 124 is a storage unit that functions as work memories of the image processor 122 and the controller 130. The buffer memory 124 can be realized by DRAM (Dynamic Random Access Memory) and the like.

The card slot 141 is a connecting unit for attaching and detaching the memory card 140. The card slot 141 can electrically and mechanically connect the memory card 140. The card slot 141 may have a function for controlling the memory card 140.

The memory card 140 is an external memory including a recording unit such as the flash memory. The memory card 140 can record data such as image information processed by the image processor 122.

The operating unit 150 is a generic name of operation buttons and operation dials provided to an outer packaging of the digital camera 100, and accepts user s operations. For example, the release button 201, the zoom lever 202, the power button 203, the center button 204, and the cross button 205 shown in FIGS. 1 and 2 correspond to the operating unit 150. When accepting an operation by a user, the operating unit 150 outputs various operation instructing signals to the controller 130.

The release button 201 is a two-step pressing button that can be in two states of a half-press state and a full-press state. When the release button 201 is half-pressed by the user, the controller 130 performs the AF (Auto Focus) control and the AE (Auto Exposure) control to determine imaging conditions. Then, when the release button 201 is full-pressed by the user, the controller 130 allows the CCD image sensor 120 to capture a still image, and records information of a captured image in the memory card 140.

The zoom lever 202 is a lever for adjusting an angle of view of an image to be captured between a wide-angle end and a telephoto end. The zoom lever 202 is a lever of center position self-return type that automatically returns to an approximately center position between the wide-angle end and the telephoto end after an operation. When operated by the user, the zoom lever 202 outputs an operation instructing signal for driving the zoom lens 112 to the controller 130. For example, when the zoom lever 202 is operated to the position of the wide-angle end, the controller 130 drives the zoom lens 112 to capture a subject at a wide angle. When the zoom lever 201 is operated to the position of the telephoto end, the controller 130 drives the zoom lens 112 to capture a subject in a telephoto manner.

The power button 203 is a pressing button for turning ON/OFF a supply of a power to the respective units composing the digital camera 100. When the power button 203 is pressed by the user at the time when the power is OFF, the controller 130 supplies a power to the respective units composing the digital camera 100 to activate them. Further, when the power button 203 is pressed by the user at the time when the power is ON, the controller 130 stops the power supply to the respective units.

The center button 204 is a pressing button. When the digital camera 100 is in the recording mode or the reproducing mode and the center button 204 is pressed by the user, the controller 130 displays a menu screen on the liquid crystal monitor 123. The menu screen is a screen for setting various conditions of the imaging and reproducing. When the center button 204 is pressed while a setting term of the various conditions is selected and, the center button 204 functions as a determination button.

The cross button 205 is composed of four buttons provided to up, down, right and left of the center button 204. These buttons are pressing buttons. When the user presses any one of the up, down, right and left buttons composing the cross button 205, a selected position is moved up, down, right and left so that the various condition terms displayed on the liquid crystal monitor 123 can be selected.

The flashbulb 160 is composed of a xenon tube, a capacitor, a booster circuit, and a light emission trigger circuit and the like. The digital camera 100 allows the flashbulb 160 to instantaneously emit light to a subject at the time of imaging to be capable of brightening the subject.

1-2. Correspondence Relationship

The CCD image sensor 120 is one example of an imaging sensor. The AFE 121 is one example of a gain setting unit. The flash memory 142 is one example of a storage unit. The controller 130 is one example of a determination unit. The image processor 122 is one example of a white balance correcting unit. The controller 130 is one example of a color temperature setting unit. The digital camera 100 is one example of the imaging apparatus.

1-3. Operation

Figure 7B:
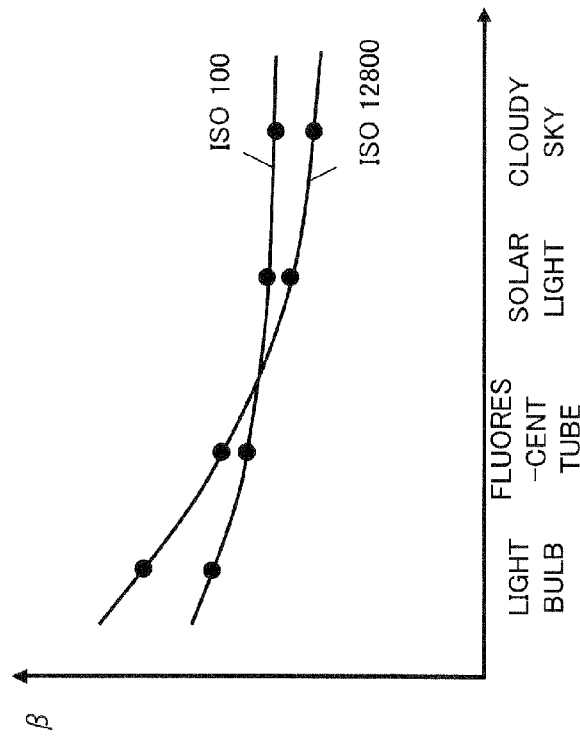
FIG. 7B is a diagram illustrating the relationship between the color temperature and the white balance gain, concretely, the relationship between the color temperature and the white balance gain relating to a B component in (R, G, and B).
Figure 7A:
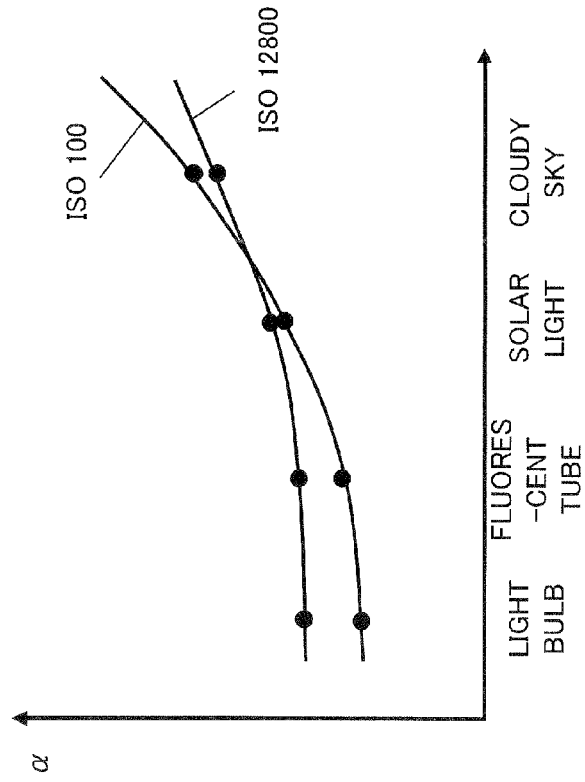
FIG. 7A is a diagram illustrating a relationship between color temperature and the white balance gain, concretely, the relationship between the color temperature and the white balance gain relating to an R component in (R, G, and B).

The white balance correcting operation of the digital camera 100 will be described. Before the description of the correcting operation, a problem in the present embodiment will be described. FIGS. 7A and 7B are diagrams illustrating a relationship between color temperature and the white balance gain. Concretely, FIG. 7A is the diagram illustrating the relationship between the color temperature of the R component in the image information (R, G, and B) and the white balance gain. FIG. 7B is the diagram illustrating the relationship between the color temperature of the B component in the image information (R, G, and B) and the white balance gain. These diagrams illustrate the white balance gains that can give suitable white balance in the cases of ISO100 and ISO12800 as examples. As shown in FIGS. 7A and 7B, the white balance gains are different in the cases of ISO100 and ISO12800 even in the same light source. This is because of the following reason.

Figure 8:
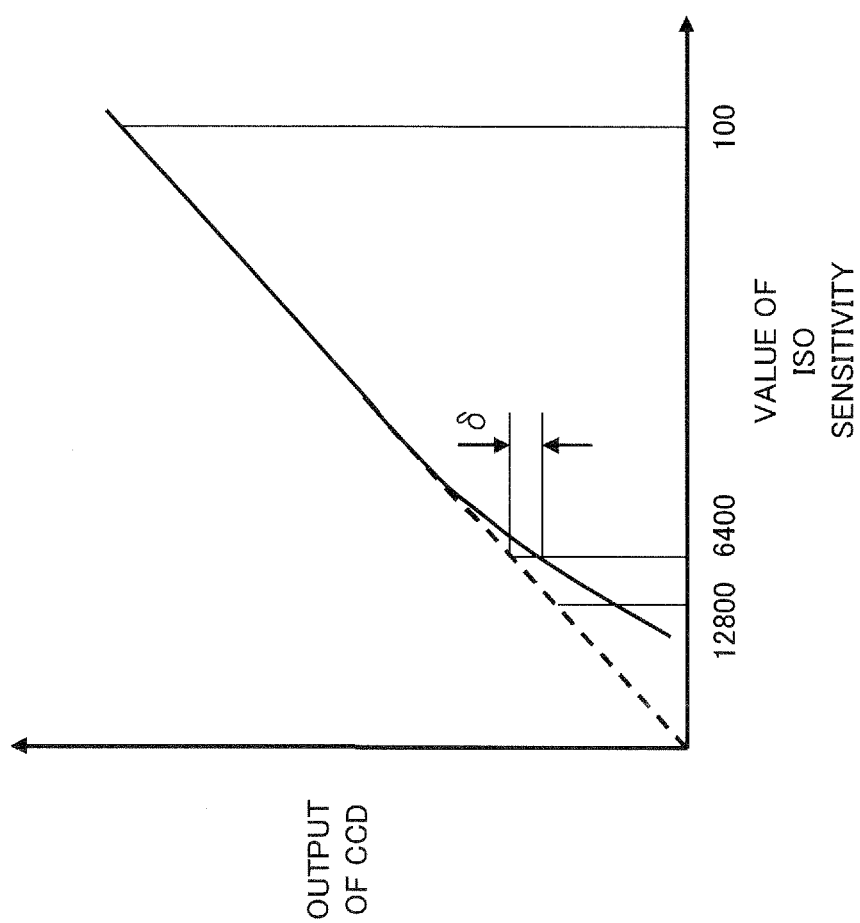
FIG. 8 is a diagram illustrating characteristics of output values of a CCD image sensor with respect to ISO sensitivity.

Specifically, FIG. 8 illustrates output characteristics of the CCD image sensor 120 with respect to the values of the ISO sensitivity. As shown in FIG. 8, the reason is such that a level of an image signal output from the CCD image sensor 120 does not have linearity with respect to the ISO sensitivity. Herein, FIG. 8 illustrates the output characteristic of the R component in the R, G, and B image signals output from the CCD image sensor 120 as one example. Not shown in FIG. 8, but the linearity varies with respect to the ISO sensitivity among the "R" component, the G component, and the B component composing the image signal. For this reason, as shown in FIGS. 7A and 7B, for example, when an attention is paid to solar light, in the R component (see FIG. 7A), the white balance gain ($\alpha$) is larger at ISO sensitivity 12800 than that at ISO sensitivity 100. On the contrary, in the B component (see FIG. 7B), the white balance gain ($\beta$) is larger at ISO sensitivity 100 than that at ISO sensitivity 12800. Therefore, for example, in a case where ISO12800 is set, when the white balance is adjusted by using the white balance gain at the time of ISO100, a shade of an image after the adjustment of the white balance shifts from an original shade. In particular, when a difference in the output value at the same ISO caused by the variation in the linearity among the color components exceeds, for example, 10%, the shade shift that can be easily recognized by the user occurs. Conventionally, high-sensitivity ISO such as ISO6400 and ISO12800 has not been used due to a problem of many noises. For this reason, the above problem is not noticeable. However, the noise problem at the high-sensitivity ISO is being solved by recent improvement in the techniques, and thus the use of the high-sensitivity ISO is demanded. In order to cope with this, in this embodiment, a configuration for setting the white balance gain according to ISO sensitivity is adopted, so that the above problem at the time of using the high-sensitivity ISO is solved. The white balance correcting operation of the digital camera 100 according to the embodiment will be described below with reference to FIG. 9.

Figure 9:
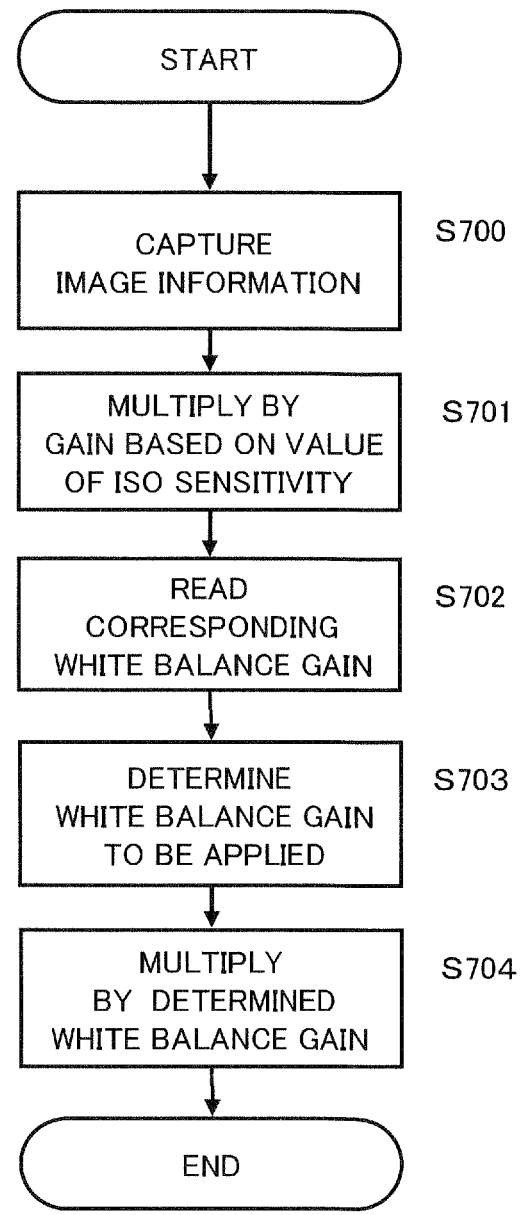
FIG. 9 is a flowchart illustrating a white balance correcting operation of the digital camera according to the embodiment.

FIG. 9 is a flowchart illustrating the white balance correcting operation of the digital camera 100 according to the first embodiment. When the digital camera 100 is in the still image and moving image recording modes, the CCD image sensor 120 captures a subject image and generates image information (S700). The controller 130 allows the AFE 121 to execute various processes on the image information generated by the CCD image sensor 120, and then to output the image information to the image processor 122. The AFE 121 multiples the obtained image information by a determined gain based on a value of the ISO sensitivity (an output signal amplification gain) (S701). For example, the AFE 121 multiplies image information (Crc, Crg, and Crb) generated by the CCD image sensor 120 by gains (Gir, Gig, and Gib) based on the value of ISO sensitivity, so as to obtain outputs (Crc·Gir, Crg·Gig, and Crb·Gib). The gain based on the value of the ISO sensitivity is proportional to the value of ISO sensitivity, for example. The value of the ISO sensitivity set at this time may be automatically determined by the controller 130 based on an image processing result notified to the controller 130 from the image processor 122 or may be arbitrarily set by the user. When the controller 130 automatically determines the value, the value of the ISO sensitivity is determined based on the image processing result notified from the image processor 122 according to a predetermined program chart diagram. When the user arbitrarily sets the value, the user operates the center button 204 and the cross button 205 to display a setting screen of the values of the ISO sensitivity on the liquid crystal monitor 123. Thereafter, the value of the ISO sensitivity that is selected by the user is set from the displayed values of the ISO sensitivity as display setting candidates.

When the image information is supplied, the image processor 122 executes the white balance correcting process. At this time, the method of the white balance correction includes the correction using the auto white balance function and the correction using the manual white balance function. In the correction using the auto white balance function, the white balance correcting circuit 133 automatically estimates the color temperature of the light source. The white balance correcting circuit 133 notifies the controller 130 an estimated result of the color temperature. On the other hand, in the correction of the manual white balance function, the user arbitrarily sets the color temperature of the light source. The controller 130 recognizes the color temperature notified from the white balance correcting circuit 133 or the color temperature of the light source set by the user, and sets these color temperatures as color temperatures for the white balance correction.

The controller 130 determines a corresponding related white balance gain based on the set value of the ISO sensitivity and the color temperature. Specifically, the controller 130 reads the corresponding white balance gain from the white balance gain setting table 200 stored in the flash memory 142 based on the set value of the ISO sensitivity and the color temperature (S702).

As described above, the flash memory 142 stores the white balance gain setting tables 201, 202, and 203 corresponding to the driving modes of the CCD image sensor 120. At step S702, the controller 130 reads the white balance gains corresponding to the set value of ISO sensitivity and the color temperature from the white balance gain setting tables 201, 202, and 203 corresponding to the current driving mode of the CCD image sensor 120.

For example, when the set value of the ISO sensitivity is ISO200 and the estimated or set color temperature is color temperature (5500 K) of solar light, the corresponding white balance gains are ($\alpha c2$, 1, and $\beta c2$) according to the tables in FIG. 6. At this time, the controller 130 reads the corresponding white balance gains ($\alpha c2$, 1, and $\beta c2$) from the flash memory 142 (S702).

Thereafter, the controller 130 determines the white balance gain to be applied to the white balance correction (S703). In this case, the corresponding white balance gains are present in the white balance gain setting table 200, and thus the read white balance gains ($\alpha c2$, 1, and $\beta c2$) are determined as the white balance gains applied to the white balance correction (S703). The controller 130 notifies the image processor 122 of the determined white balance gains. The white balance correcting circuit 133 in the image processor 122 multiplies the image information that is obtained by the multiplication by the gains based on the value of the ISO sensitivity at step S701, by the white balance gains notified from the controller 130 (S704). When the image information (Crc·Gir, Crg·Gig, and Crb·Gib) that are obtained by the multiplication by the gains based on the value of the ISO sensitivity at step S701, are (Dr, Dg, and Db), results of the multiplication by the white balance gains are ($\alpha c2 \cdot Dr$, Dg, and $\beta c2 \cdot Db$). The controller 130 outputs the multiplied results to the processor in the image processor 122.

When the corresponding white balance gains are not present in the white balance gain setting table 200 stored in the flash memory 142, an operation is performed as follows. For example, when the set value of the ISO sensitivity is 100 and the estimated (determined) or set color temperature is 5000 K that is between a fluorescent tube (4500 K) and solar light (5500 K), the corresponding white balance gains are not present in the setting tables in FIG. 6. When the related white balance gains are not present, the controller 130 obtains the white balance gains according to interpolation operation. Concretely, in ISO100, the controller 130 reads the white balance gains of colors of the two or more typical light sources such as a fluorescent tube (4500 K) and solar light (5500 K) from the flash memory 142 (S702). Next, the controller 130 obtains the white balance gains corresponding to 5000 K at ISO100 based on the read white balance gains of the fluorescent tube (4500 K) and the solar light (5500 K) with the interpolation operation. The controller 130 determines the white balance gains ($\alpha E1$, 1, and $\beta E1$) obtained by the interpolation operation as the white balance gains to be applied to the white balance correction (S703). The controller 130 notifies the image processor 122 of the determined white balance gains. The white balance correcting circuit 133 in the image processor 122 multiplies the image information that is obtained by the multiplication by the gains based on the value of the ISO sensitivity at step S701, by the white balance gains notified from the controller 130 (S704). When the white balance gains determined at step S703 are ($\alpha E1$, 1, and $\beta E1$) and the image information (Crc·Gir, Crg·Gig, and Crb·Gib) obtained by the multiplication by the gains based on the value of the ISO sensitivity at step S701 are (Dr, Dg, and Db), results of the multiplication by the white balance gains are ($\alpha E1 \cdot Dr$, Dg, and $\beta E1 \cdot Db$). The controller 130 outputs the multiplied results to the processor in the image processor 122.

As a result, the digital camera 100 ends the white balance correcting operation. After the white balance correcting process, the image information is subject to a process such as a compressing process in the image processor 122, and is eventually recorded in the memory card 140.

1-4. Conclusion

As described above, the digital camera 100 according to the first embodiment is provided with the CCD image sensor 120, the AFE 121, the controller 130, and the image processor 122. The CCD image sensor 120 captures a subject image and outputs the image information. The AFE 121 sets the value of the output signal amplification gain according to the ISO sensitivity at the time when an image signal output from the CCD image sensor 120 is amplified. The controller 130 determines the value of the white balance gain to be used for the white balance correction according to the output signal amplification gain set by the AFE 121. The image processor 122 performs white balance correction for the image information output from the CCD image sensor 120 based on the values of the output signal amplification gain set by the AFE 121 and the white balance gain determined by the controller 130.

With such a configuration, the value of the white balance gain to be used for the white balance correction is determined according to the value of the output signal amplification gain based on the value of the ISO sensitivity. The white balance correction is performed based on the value of the determined white balance gain. Therefore, the white balance correction can be performed according to the value of the ISO sensitivity. As a result, the white balance correction can be performed so that suitable colors can be reproduced regardless of the value of the ISO sensitivity. For example, even at the time of the high sensitivity where the value of the ISO sensitivity is large, the white balance correction can be performed so that suitable colors are reproduced.

The digital camera 100 is provided with the flash memory 142 that stores the white balance gain setting tables (corresponding information) which relates the values of the ISO sensitivity settable by the AFE 121 with the values of the white balance gains settable in the settable value of the ISO sensitivity to store these values. Based on the value of the ISO sensitivity set by the AFE 121, the value of the white balance gain in ISO sensitivity is read from the flash memory 142, and the value of the white balance gain to be used for the white balance correction is determined based on the read value of the white balance gain.

As a result, the value of the white balance gain can be suitably set according to the value of the ISO sensitivity.

The digital camera 100 according to the first embodiment further has the controller 130 for setting the color temperature to be used for the white balance correction. The flash memory 142 stores the value of ISO sensitivity settable by the AFE 121, the value of the color temperature settable by the controller 130, and, the value of the ISO sensitivity settable by the AFE 121 and the white balance gain at the color temperature settable by the controller 130, in the state that these information are related each other. The controller 130 reads the corresponding white balance gain from the flash memory 142 based on the set value of the ISO sensitivity and the color temperature, to determine the value of the white balance gain applied to the white balance correction.

As a result, the digital camera 100 can multiply the image information by the suitable white balance gain according to the set color temperature and the ISO sensitivity.

The digital camera 100 according to the first embodiment has a plurality of driving modes as the driving modes of the CCD image sensor 120. The flash memory 142 stores the setting tables according to the plurality of driving modes. The controller 130 determines the white balance gain to be used for the white balance correction based on the setting tables according to the driving modes.

With such a configuration, the digital camera 100 can multiply the image information by the suitable white balance gain according to the driving modes of the CCD image sensor 120. In the CCD image sensor 120, a reading speed of the accumulated charges varies according to the driving modes. For this reason, RGB balance output for the respective driving modes varies. In order to cope with this problem, when the white balance setting tables are stored according to the plurality of driving modes in the present invention, the digital camera 100 can set the white balance gain that is suitable for a current set driving mode.

Other Embodiments

The present invention is not limited to the first embodiment, and various embodiments are considered. Other embodiments of the present invention will be described below.

The first embodiment described the CCD image sensor 120 as one example of the imaging unit, but the present invention is not limited to this. That is, the imaging unit may be another imaging device such as a CMOS image sensor or an NMOS image sensor. In the case of the CCD image sensor, as described in the first embodiment, charges generated on the pixels are transferred to the AFE 121, and are multiplied by the gain based on the value of the ISO sensitivity so as to be treated as image signals. However, in the case of the CMOS image sensor, after charges are accumulated on the pixels, they may be multiplied by the gain based on the value of the ISO sensitivity so as to be treated as the image signal on the respective pixels. When the CMOS image sensor is used as the imaging unit, a gain setting unit corresponds to a gain controller in the CMOS image sensor.

Further, in the first embodiment, the filters for color separation were the primary-color filters of RGB, but complementary filters of CMY or the like may be used. In this case, as the white balance gain setting table 200, a table in which the respective settable values of the ISO sensitivity are related to the white balance gains for the respective complementary filters may be stored in the flash memory 142.

In the first embodiment, in the white balance gain setting table 200, the white balance gains at the time when the ISO sensitivity is ISO100, ISO200, ISO6400, and ISO12800 are defined for a light bulb (3200 K), a fluorescent tube (4500 K), solar light (5500 K), and cloudy sky (6500 K), but the table is not limited to this. For example, in the white balance gain setting table 200, only the white balance gains at a fluorescent tube (4500 K) and solar light (5500 K) may be defined. At this time, the white balance at color temperatures other than a fluorescent tube (4500 K) and solar light (5500 K) may be interpolated based on the white balance gains at a fluorescent tube (4500 K) and solar light (5500 K).

In the first embodiment, in the white balance setting table 200, the white balance gains at the time when the ISO sensitivity is ISO100, ISO200, ISO6400, and ISO12800 are defined. However, only the white balance gain at predetermined low ISO sensitivity and the white balance gain at predetermined high ISO sensitivity may be defined. For example, only the white balance gain at ISO100 and the white balance gain at ISO6400 may be defined.

In this case, (1) regarding the white balance gain at the time when the ISO sensitivity is higher than ISO100 and lower than ISO6400, the white balance gain at the time of ISO100 as the low ISO sensitivity may be applied. This is because a ratio of a noise component to an image signal component in image information output from the CCD image sensor 120 is small at the low ISO sensitivity to be allowable, and thus the white balance gain calculated from such image information has high accuracy and high reliability with respect to color reproducibility.

(2) Regarding the white balance gain at ISO6400, the white balance gain at ISO6400 may be applied. A ratio of a noise component to an image signal component in the image information from the CCD image sensor 120 noticeably increases at ISO6400 more than that at the ISO sensitivity lower than ISO6400. That is, a noise noticeably appears, and thus the noise component with respect to the image signal component is not allowable. When the result of multiplication by the gain based on ISO6400 is multiplied by the white balance gain at ISO100, RGB balance might be disrupted. For this reason, when imaging is carried out with ISO6400, the image processor 122 multiplies the result of multiplying the image information by the gain based on ISO6400 by the white balance gain calculated with ISO6400. As a result, the color reproducibility can be improved also at the time of setting the high ISO sensitivity such as ISO6400.

(3) Regarding the white balance gain at ISO12800 as the ISO sensitivity higher than ISO6400, the white balance gain at ISO6400 may be applied. At ISO12800 as ISO sensitivity higher than ISO6400, a ratio of the noise component to the image signal component is very large. That is, in a region of ISO sensitivity higher than ISO6400, a noise appears more noticeably than ISO6400. For this reason, in the white balance gain calculated based on the image information obtained at ISO12800, accuracy is low and the reliability with respect to the color reproducibility is low. Further, similarly to the above example, when the result of multiplying the image information by the gain based on ISO12800 is multiplied by the white balance gain at ISO100, the RGB balance might be disrupted. For this reason, when imaging is carried out with ISO12800, the image processor 122 multiplies the result of multiplying the image information by the gain based on ISO12800 by the white balance gain calculated based on ISO6400. As a result, also at the time when high ISO sensitivity such as ISO12800 is set, the color reproducibility can be improved. In the above description, ISO6400 and ISO12800 are examples of the high ISO sensitivity, but the high ISO sensitivity is not limited to them. That is, a predetermined threshold other than ISO6400 and ISO12800 may be set according to a level of the color reproducibility of a finished image.

In the above example, ISO6400 is used as the predetermined high ISO sensitivity, but the high ISO sensitivity is not limited to this value. For example, a value of the ISO sensitivity for enabling discrimination between an ISO sensitivity region where a noise appears noticeably and an ISO sensitivity region where a noise is not noticeable may be used. For example, as shown in FIG. 8, in a relationship (linearity) between the value of the ISO sensitivity and the output from the CCD image sensor 120, in the high ISO sensitivity region, the linearity is gradually disrupted as increasing of the value of the ISO sensitivity. In this case, the value of ISO sensitivity with which the amount of shift from the linearity δ first exceeds 10% may be used as the value of the predetermined high ISO sensitivity.

The first embodiment described the example where the white balance gain setting table is used for determining the white balance gain, but the present invention is not limited to this. That is, a configuration may be such that related values of the white balance gain can be read for the plurality of ISO sensitivity.

In the first embodiment, after the multiplication by the gain based on the value of the ISO sensitivity at step S701, the multiplication by the white balance gain is additionally carried out at step S703, but the present invention is not limited to this. For example, a value obtained by multiplying the gain based on the value of the ISO sensitivity by the white balance gain may be defined in the setting table. The defined value is read based on the ISO sensitivity (and color temperature) at step S702, and the process thereafter is executed. As a result, step S701 can be omitted.

The technical ideas in the above embodiments can be applied to a lens built-in camera and a lens detachable camera.

As described above, according to the above embodiments, the imaging apparatus that can correct the white balance so that suitable colors are reproduced also at the time of high sensitivity can be provided.

INDUSTRIAL APPLICABILITY

The present invention can be widely applied to not only digital cameras but also imaging apparatuses, such as movie cameras and information terminals with cameras that perform white balance correction at the time of capturing.

What is claimed is:

1. An imaging apparatus comprising:
   an imaging sensor operable to capture a subject image to output image information;
   a gain setting unit operable to set a value of an output signal amplification gain according to a value of ISO sensitivity for amplifying the image information output from the imaging sensor;
   a determination unit operable to determine a value of white balance gain to be used for white balance correction according to the value of the output signal amplification gain set by the gain setting unit according to the value of ISO sensitivity; and
   a white balance correcting unit operable to perform white balance correction on the image information output from the imaging sensor based on the value of the output signal amplification gain set by the gain setting unit according to the value of ISO sensitivity and the value of the white balance gain determined by the determination unit;
   wherein the white balance gain is changed according to the value of ISO sensitivity.

2. The imaging apparatus according to claim 1, further comprising:
   a storage unit operable to store corresponding information which relates the value of the output signal amplification gain settable by the gain setting unit with the value of the white balance gain settable at the settable value of the output signal amplification gain,
   wherein the determination unit reads from the storage unit the value of the white balance gain corresponding to the output signal amplification gain set by the gain setting unit, and determines the white balance gain to be used for the white balance correction based on the read value of the white balance gain.

3. The imaging apparatus according to claim 2, further comprising:
   a color temperature setting unit operable to set a color temperature to be used for the white balance correction, wherein
   the storage unit stores corresponding information which includes the value of the output signal amplification gain settable by the gain setting unit, the color temperature settable by the color temperature setting unit, and the white balance gain, relating the value of the output signal amplification gain, the color temperature, and the white balance to each other,
   the determination unit reads the white balance gain at the value of the output signal amplification gain and the color temperature from the storage based on the settable value of the output signal amplification gain and the settable color temperature, and determines the white balance gain to be used for the white balance correction based on the read white balance gain.

4. The imaging apparatus according to claim 2, wherein a plurality of driving modes are provided as driving modes of the imaging sensor,
   the storage unit stores corresponding information corresponding to the plurality of driving modes,
   the determination unit determines the white balance gain to be used for the white balance correction based on the corresponding information related to the plurality of driving modes.

5. The imaging apparatus according to claim 2, wherein when the output signal amplification gain on a side of sensitivity higher than a predetermined gain is set by the gain setting unit, the determination unit reads the white balance gain at an output signal amplification value on a side of a sensitivity lower than the set output signal amplification gain from the storage unit, and determines the white balance gain to be applied to the white balance correction.

6. The imaging apparatus according to claim 3, wherein
a plurality of driving modes are provided as driving modes of the imaging sensor,
the storage unit stores corresponding information related to the plurality of driving modes,
the determination unit determines the white balance gain to be used for the white balance correction based on the corresponding information related to the plurality of driving modes.

7. The imaging apparatus according to claim 3, wherein when the output signal amplification gain on a side of sensitivity higher than a predetermined gain is set by the gain setting unit, the determination unit reads the white balance gain at an output signal amplification value on a side of sensitivity lower than the set output signal amplification gain from the storage unit, and determines the white balance gain to be applied to the white balance correction.

8. The imaging apparatus according to claim 4, wherein when the output signal amplification gain on a side of sensitivity higher than a predetermined gain is set by the gain setting unit, the determination unit reads the white balance gain at an output signal amplification value on a side of sensitivity lower than the set output signal amplification gain from the storage unit, and determines the white balance gain to be applied to the white balance correction.

9. The imaging apparatus according to claim 4, wherein
the plurality of driving modes include a still image recording mode in which the image sensor captures a still image, a moving image recording mode in which the image sensor captures a moving image, and a through image recording mode in which the image sensor captures a through image.

10. The imaging apparatus according to claim 6, wherein
the plurality of driving modes include a still image recording mode in which the image sensor captures a still image, a moving image recording mode in which the image sensor captures a moving image, and a through image recording mode in which the image sensor captures a through image.

* * * * *